United States Patent
Rohner

[11] Patent Number: 6,116,432
[45] Date of Patent: Sep. 12, 2000

[54] MOUNTING FOR RECTANGULAR OBJECTS AND USE THEREOF

[76] Inventor: Thomas Rohner, Virchowstrasse 20, Bergisch Gladbach 51427, Germany

[21] Appl. No.: 09/194,316
[22] PCT Filed: May 22, 1997
[86] PCT No.: PCT/DE97/01028
§ 371 Date: Nov. 24, 1998
§ 102(e) Date: Nov. 24, 1998
[87] PCT Pub. No.: WO97/45838
PCT Pub. Date: Dec. 4, 1997

[30] Foreign Application Priority Data

May 24, 1996 [DE] Germany .................... 196 21 163

[51] Int. Cl.⁷ ........................................... A47F 7/00
[52] U.S. Cl. ..................... 211/40; 211/194; D6/407; 312/9.9; 206/308.1
[58] Field of Search ............................ 211/40, 41.12, 211/41.1, 194; 312/9.9; D6/407; 206/308.1

[56] References Cited

U.S. PATENT DOCUMENTS

| | | | |
|---|---|---|---|
| D. 220,317 | 3/1971 | Adell | D7/407 |
| D. 328,972 | 9/1992 | Lunn | D7/407 |
| 4,723,662 | 2/1988 | Johnson | 211/40 |
| 4,741,438 | 5/1988 | Mastronardo et al. | 211/40 X |
| 4,819,802 | 4/1989 | Gutierrez | 312/9.9 X |
| 5,415,298 | 5/1995 | Callahan et al. | 211/40 |
| 5,577,620 | 11/1996 | Jacob | 211/40 |
| 5,647,487 | 7/1997 | Reinhard | 211/40 |
| 5,715,948 | 2/1998 | Hung | 211/40 |
| 5,727,695 | 3/1998 | English | 211/40 |

*Primary Examiner*—Robert W. Gibson, Jr.
*Attorney, Agent, or Firm*—Diller, Ramik & Wight, PC

[57] ABSTRACT

The invention concerns a mounting for flat objects, such as CD cases for example. According to the invention, an open frame (1) consists of an upper side leg (2), a lower side leg (3) and a transverse leg (4). In a preferred embodiment of the frame (1), the outer edges (5, 6, 7) of the legs (2, 3, 4) and the inner edges (8, 9, 10) are interconnected at right angles, the inner edge and outer edge of a leg being non-parallel, so forming a tilted holder (11). Since one inner edge (9) is shorter than the length of an edge of the object to be held, a corner of the object projects over the end face (22) of the frame (1). The frames can be secured adjacent to one another by suitable securing elements, and adjacent frames can be rotated through 180°, such that the projecting corners of the objects to be stored lie alternately at the top and the bottom, and the objects can thus be removed from the mountings easily, even through the amount of space available is very small. The mountings can also be used as packaging, or part of the packaging, for the objects.

10 Claims, 3 Drawing Sheets

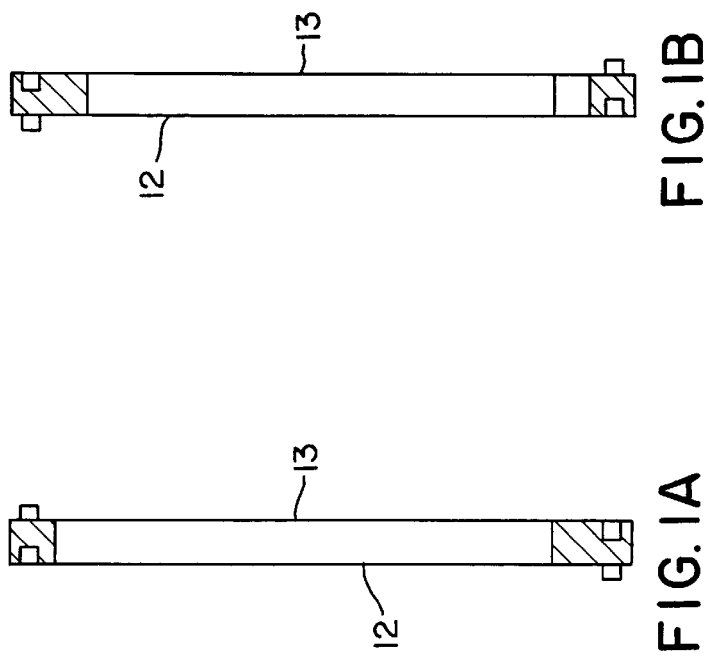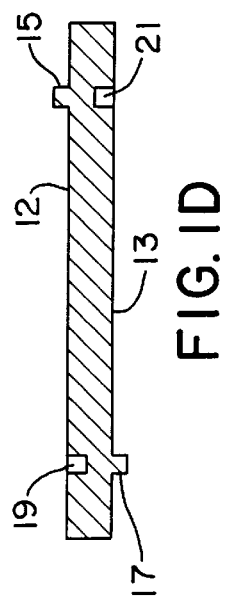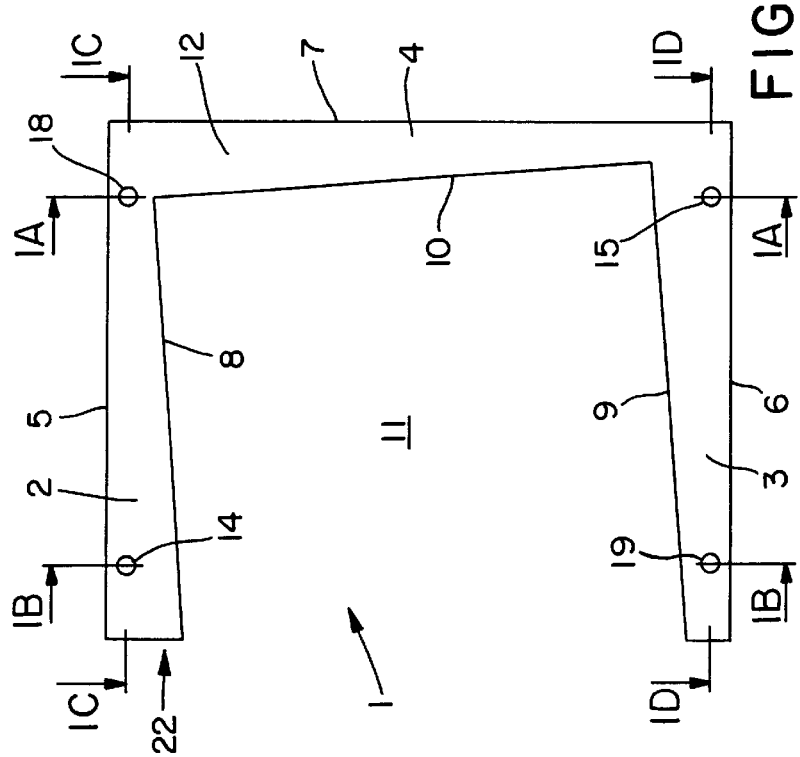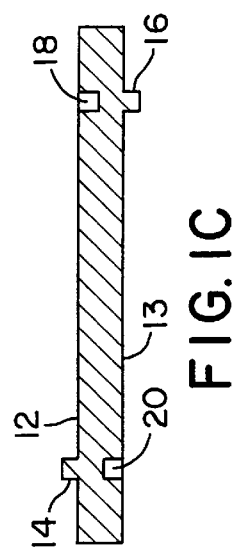

MOUNTING FOR RECTANGULAR OBJECTS AND USE THEREOF

BACKGROUND OF THE INVENTION

The invention relates to a mounting for rectangular, flat objects, particularly for CD cases and video cassettes. Moreover, the invention also relates to various uses of the mounting according to the invention.

Mountings for accommodating, storing or archiving rectangular objects, such as CD cases and video cassettes, are familiar in the form of rack systems of various configurations, where the parts can be mounted horizontally or vertically. A rack system of this kind is described in DE-PS 42 43 540, for example.

Different types of mountings and/or supporting elements are used in these rack systems, these being fastened to guide sections in detachable fashion and capable of being displaced in their longitudinal direction. In this way, it is possible during archiving, for example, to insert new CD cases with additional mounting at any point in the rack system.

In the familiar rack system, however, the number of mountings is limited by the length of the guide sections. Moreover, the individual mountings are relatively complicated to manufacture, owing to the need for fastening elements for fastening the mountings to the guide sections.

SUMMARY OF THE INVENTION

The familiar rack system also requires a relatively large amount of space, as the individual objects to be stored are a certain distance apart, so that they can easily be removed from the mountings.

The invention is based on the task of creating a mounting for rectangular, flat objects which is inexpensive to manufacture, in which the objects to be held can be stored without intermediate gaps and where the objects can be removed conveniently without having to perform additional manipulations on the mountings.

According to the invention, this task is solved by an open frame consisting of opposite side legs a certain distance apart and a transverse leg connecting the side legs, these forming an approximately U-shaped holder, where the inner edges of the opposite side legs are parallel to each other, at least over a major portion of their length, and the distance between the parallel part of the inner edges of the side legs corresponds to an edge length of the object to be held, and where the length of at least one inner edge of a side leg is shorter than the other edge length of the object to be held.

As a result of the geometrical relationships of the inner edges of the side legs in relation to each other and in relation to the objects to be held, CD cases, for example, lie in a slightly tilted position relative to the vertical or horizontal inside the mounting. In this context, they project beyond the front face of the mounting, at least on one side, as the length of at least one inner edge of a side leg is shorter than the edge length of the object to be held. This results in a projecting corner, which makes it easy to remove the CD case.

The outer contour of the mounting according to the invention can essentially be selected at will. In an advantageous embodiment of the invention, however, the open frame is designed as a U-shaped angular frame. In this case, the outer edges and the opposite inner edges of the side legs are parallel to each other, at least over a major portion of their length, and the outer edges of the side legs form a right angle with the outer edge of the transverse leg. In this context, the inner edge and the outer edge of each side leg are non-parallel.

As the outer edges of the three legs are interconnected at right angles in this configuration, the mounting can be set up in space-saving manner against the rear wall of a cupboard shelf, a drawer or an open shelf.

In the configuration as per claim 3, where the inner edges of the side legs additionally form right angles with the inner edge of the transverse leg and the inner edge of the transverse leg is not parallel to its outer edge, the rectangular objects to be held can be pushed flush against the inner edge of the rear transverse leg, so that the rear area of the outer contour of the object to be held is surrounded by the frame according to the invention in form-fitting fashion and the size of the frame is minimised.

The frames are preferably designed in such a way that they correspond to the width of the object to be held. In this way, the objects to be held can be positioned alongside or on top of each other without space-consuming gaps between them.

In order to form a rack, several mounting frames are joined together side by side in such a way that the inner edges of the side legs of adjacent mountings are tilted at different angles relative to the horizontal. As a result, the projecting corner of the CD case in one mounting is at the top, for example, while the projecting corner of the CD case in the two adjacent mountings is at the bottom. In this way, the individual CD cases can easily be gripped and pulled out of the mountings without, as already mentioned, there being a need for gaps between the individual CD cases.

In this context, the angles of inclination of the inner edges of the side legs are relatively small, so that the CD cases cannot slip forwards and out of the mountings on their own.

In the simplest case, the mountings according to the invention can be assembled by bonding in such a way that the outer edges of the legs are aligned with each other. This results in a long storage unit, which can be extended at will.

However, in order to be able to connect the individual frames together, they expediently display lateral securing elements which interact with the securing element of the adjacent frame and are located on the side surfaces in such a way that the outer edges of the legs lie flush with each other. In this context, the securing elements are located on the side surfaces in such a way that the individual frames can be assembled side by side or on top of each other with the inner edges of the side legs either flush or not flush. If the inner edges are flush, it is possible, for example, to insert an object which is wider than the width of one frame. In this way, one and the same frame can be used to assemble a rack for CD cases of different thicknesses, provided that their edge lengths are identical. If the frames are assembled in such a way that the inner edges of their side legs are not flush, as is usually the case, the tilting of the inner edges in relation to each other results in front and rear guide surfaces, against which the inserted CD case is laterally supported, so that it is mounted exactly in its vertical or horizontal position.

In order to be able to interconnect the frames in a simple manner, and preferably in detachable fashion, the securing elements can, for instance, be designed as known which can be inserted or pressed into corresponding recesses in the wall of the adjacent frames. In addition, it is also possible, for example, to design the securing elements as permanent magnets set into the wall of the frames, these interacting with corresponding magnetisable plates on the adjacent frame.

In order to be able to assemble the mounting with the inner edges of their side legs either flush or at an angle to each other, the securing elements are positioned on the side wall of the frames in such a way that, when viewed in a clockwise direction, the knobs and recesses, or the permanent magnets and magnetisable plates, are arranged in alternating fashion. To this end, it is also necessary for a knob on one side of the frame have a recess in the wall on the opposite side. As a result, adjacent frames can be assembled either in the same position or rotated through 180°.

the mountings are all of identical design and thus relatively inexpensive to manufacture, particularly if manufactured as injection mouldings or stamped parts.

In order to facilitate the insertion of a cassette at the face end of a frame, the inside edge of at least one of the side legs can display a bevel to enlarge the width of the opening in the frame. Moreover, for easier insertion of the object to be held, at least one of the side legs can also display a notch-like guide in the area of its inner edge. In this context, the notch is designed in such a way that it forms a run-in bevel which forces the object to be held in a direction parallel to the longitudinal centre plane of the frame during insertion. If the thickness of the frame and the thickness of the object to be stored correspond, the objects are thus automatically guided in such a way that their side surfaces are positioned flush with each other.

As already mentioned, the mounting is preferably used to create a connectable storage or racking system. In this context, the sides of the end frames can be sealed using covers, the insides of which possess securing elements which interact with those of the end frame, thus producing a smooth, plane end surface.

Another advantageous use of the mounting according to the invention is that it can be used as the packaging, or part of the packaging, for the rectangular objects.

In this capacity, the frame serves to protect the object against mechanical damage, on the one hand, and can, on the other hand, be used as part of an expandable racking system in the manner described. When used for the latter purpose, it may be advantageous to fix a second frame with relatively short side legs to the front end of the frame. In this context, the second frame is designed in such a way that it forms a flat, rectangular packaging in conjunction with the actual frame. The second frame is advantageously transparent in this context, so that the information printed on the back of a CD case, for example, can be read.

When using a second frame, it is also easily possible to provide the packaging formed in this way with a preferably transparent wrapper made of film or the like, which additionally fixes the second frame in place. Naturally, the wrapper can also be dispensed with if the two frames can be fixed to each other with the aid of corresponding securing elements, or if they are joined together in one piece via a predetermined breaking point.

The individual frames can display drilled holes or openings running in the direction of their longitudinal centre plane in the area of their side and/or transverse legs. With the aid of these drilled holes, the mountings, or the rack assembled from them, can be secured to a smooth wall, for example, with the aid of matching screws or other suitable securing elements.

Given an appropriate choice of the respective securing elements reaching through the drilled holes in the walls, the racks can also be secured to mounting rails or mounting eyes.

BRIEF DESCRIPTION OF THE DRAWINGS

An example of the invention is illustrated in the drawings and explained in detail below on the basis of the drawings. The drawings show the following:

FIG. 1 A side view of a frame,

FIG. 1A A cross-section taken along line A—A of FIG. 1,

FIG. 1B A cross-section taken along line B—B of FIG. 1,

FIG. 1C A cross-section taken along line C—C of FIG. 1,

FIG. 1D A cross-section taken along line D—D of FIG. 1,

DESCRIPTION OF THE PREFERRED EMBODIMENTS

Figure 2:
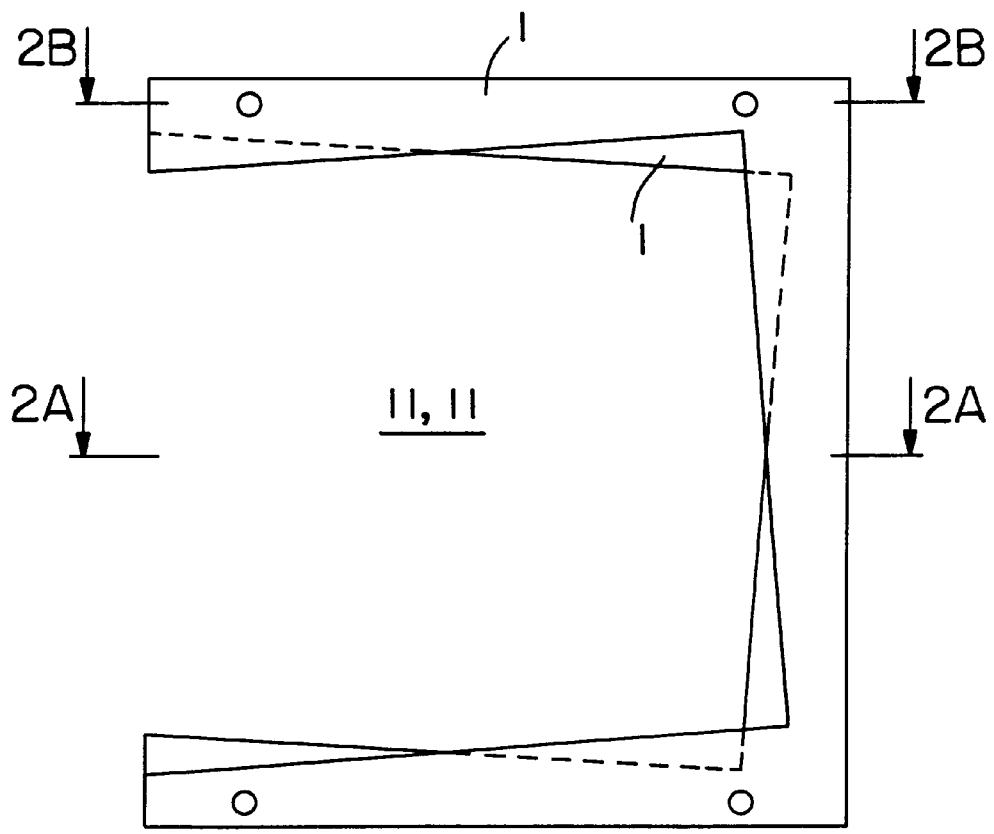
FIG. 2 A side view of two assembled frames views.
Figure 2A:
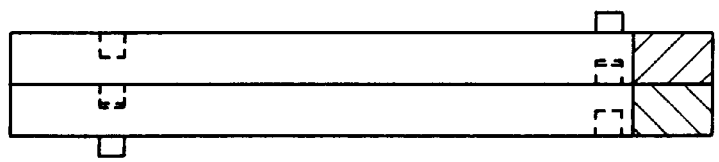
FIG. 2A A cross-section taken along line 2A—2A of FIG. 2.
Figure 2B:
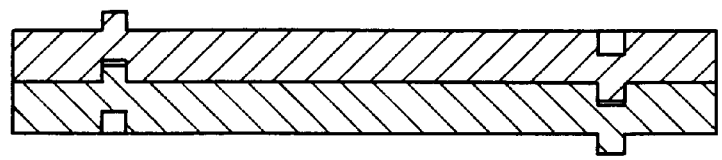
FIG. 2B A cross-section taken along line 2B—2B of FIG. 2.

Frame 1, shown in FIG. 1 through FIG. 2B, consists of upper side leg 2, lower side leg 3 and transverse leg 4, which connects the two side legs 2, 3. Outer edge 5 of upper side leg 2 and parallel outer edge 6 of lower leg 3 both form right angles with outer edge 7 of transverse leg 4.

The same applies to inner edge 8 of upper side leg 2 and inner edge 9 of lower side leg 3, which are likewise connected to inner edge 10 of transverse leg 4 at right angles. In this context, inner edges 8, 9, 10 are, however, not parallel to the corresponding outer edges 5, 6, 7, meaning that holder 11, bordered by inner edges 8, 9, 10, is tilted in relation to the U formed by outer edges 5, 6, 7.

Side surfaces 12, 13 of frame 1 each display two knobs 14, 15 or 16, 17, as well as two drilled holes 18, 19 or 20, 21, where the knobs and drilled holes alternate on one side in clockwise direction and are arranged on the different sides in such a way that a knob on side surface 12 corresponds to a drilled hole on side surface 13. In this way, frames 1 can be assembled with inner edges 8, 9 either flush or rotated through 180°, holders 11 being tilted relative to each other in the latter position. This position of two adjacent frames 1 is illustrated in FIG. 2.

Figure 3:
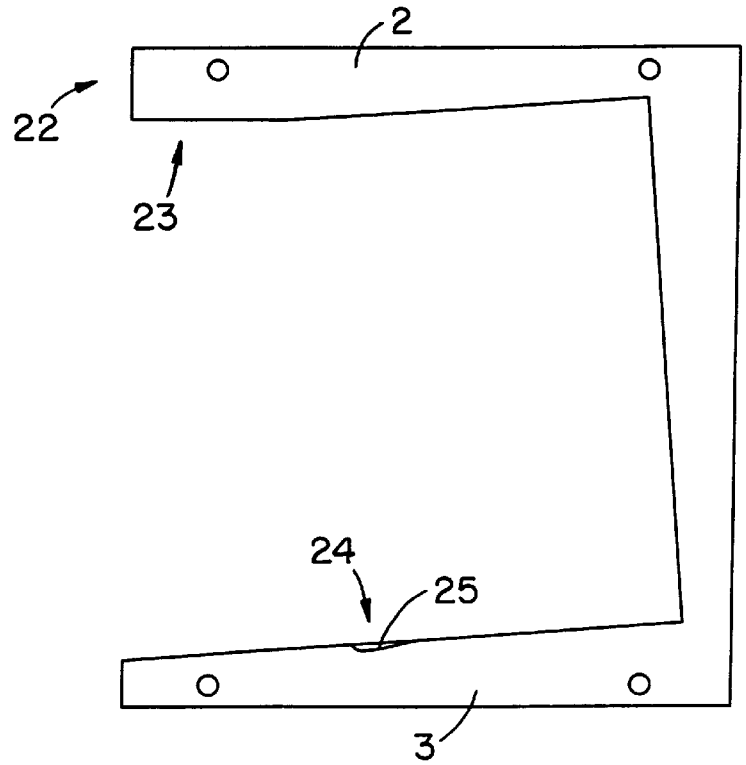
FIG. 3 A side view of a second configuration of the frame.

Frame 1, according to Fig. 3, essentially corresponds to the one illustrated in FIG. 1, but displays bevel 23 in the area of face end 22 on upper side leg 2, this enlarging the width of the opening of frame 1 in the area of face end 22.

In the illustration according to FIG. 3, lower side leg 3 is provided with a notch-like guide 24, which exerts force in the direction of the longitudinal centre plane of frame 1 with the aid of run-in bevel 25 when inserting a CD case, for example.

Figure 4:
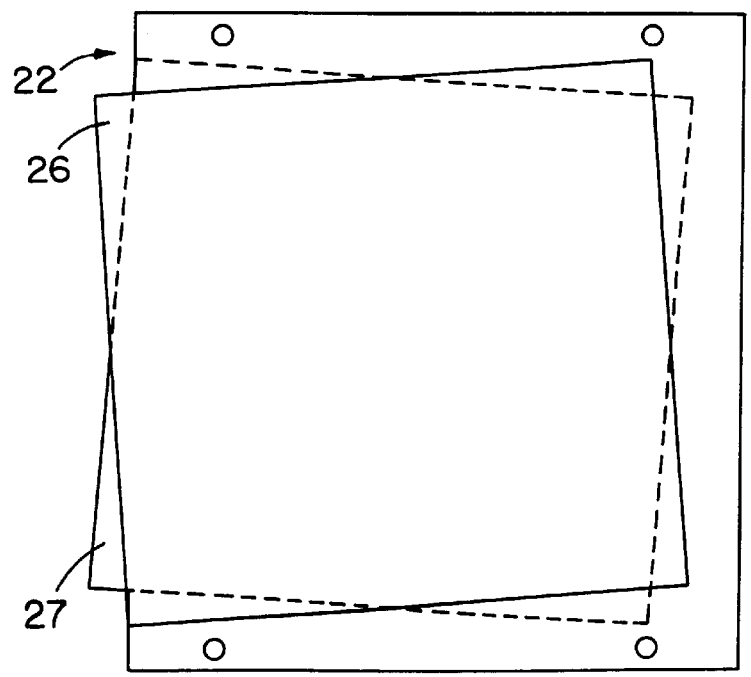
FIG. 4 A side view as per FIG. 2 with CD cases inserted.

The assembled frames 1, in accordance with FIG. 4, correspond to those in FIG. 2, although a CD case is inserted in each frame in this case, the projecting corners 26, 27 of which are respectively located at the top and the bottom and project beyond face end 22 owing to the fact that holders 11 are tilted relative to each other.

Although a preferred embodiment of the invention has been specifically illustrated and described herein, it is to be understood that minor variations may be made in the apparatus without departing from the spirit and scope of the invention, as defined the appended claims.

What is claimed is:

1. A mounting for rectangular flat objects, particularly for CD cases and video cassettes, comprising an open frame (1) including opposite side legs (2, 3) and a transverse leg (4) connecting the side legs (2, 3) and collectively defining a substantially U-shaped holder (11), inner edges (8, 9) of the opposite side legs (2, 3) being parallel to each other, the distance between the inner edges (8, 9) of the side legs (2, 3) corresponds to a first edge length of an object to be held and the length of at least one inner edge (8) of a side leg (2) is shorter than a second edge length of the object to be held, outer edges (5, 6) of the opposite side legs (2, 3) are parallel to each other and form a right angle with an outer edge (7) of the transverse leg (4), the inner edge (8 or 9) and the outer edge (5 or 6) of each side leg (2 or 3) are in non-parallel relationship to each other, the inner edges (8, 9) of the side legs (2, 3) each form a right angle with an inner edge (10) of the transverse leg (4), and the inner edge (10) of the transverse leg (4) is in non-parallel relationship to its outer edge (7).

2. Mounting as per claim 1, characterised in that the width of the frame (1) corresponds to the width of the object to be held.

3. Mounting as per claim 1, characterised in that the frame (1) displays lateral securing elements (14, 15, 16, 17, 18, 19, 20, 21) for assembling several frames (1) side by side or on top of each other, where the outer edges (5, 6, 7) of the legs (2, 3, 4) lie flush with each other.

4. Mounting as per claim 3, characterised in that the securing elements (14 to 21) are located or designed in such a way that the frames (1) can be assembled side by side or on top of each other with the inner edges (8, 9) of the side legs (2, 3) either flush or not flush.

5. Mounting as per claim 3, characterised in that the securing elements (14, 15, 16, 17) are designed as knobs which can be inserted or pressed into corresponding recesses or drilled holes (18, 19, 20, 21) in the wall of the adjacent frames.

6. Mounting as per claim 3, characterised in that the securing elements are designed as permanent magnets which interact with magnetisable elements of the adjacent frames (1).

7. Mounting as per claim 5, characterised in that knobs (14 to 17) and wall recesses or drilled holes (18 to 21), or permanent magnets and magnetisable elements, are arranged alternately on both sides of the frame when viewed in the clockwise or anti-clockwise direction, where a knob (14, 15) or a permanent magnet on the side surface (12) is faced by a drilled hole (20, 21) or a magnetisable element on the opposite side surface (13).

8. Mounting as per claim 1, characterised in that it is designed as an injection moulding or a stamped part.

9. Mounting as per claim 1, characterised in that the area of the face end (22) of at least one of the side legs (2) displays a bevel (23) enlarging the width of the opening of the frame (1).

10. Mounting as per claim 1, characterised in that at least one of the side legs (3) has a notch-like guide (24) in the area of its inner edge (9) for inserting the rectangular, flat object.

* * * * *